(No Model.)

J. C. STURGEON.
PIPE OR HOSE COUPLING.

No. 417,114. Patented Dec. 10, 1889.

Witnesses.
G. J. Mead.
F. J. Barrett

Inventor.
John C. Sturgeon

UNITED STATES PATENT OFFICE.

JOHN C. STURGEON, OF ERIE, PENNSYLVANIA, ASSIGNOR OF ONE-FOURTH TO SAMUEL A. DAVENPORT, OF SAME PLACE.

PIPE OR HOSE COUPLING.

SPECIFICATION forming part of Letters Patent No. 417,114, dated December 10, 1889.

Application filed September 30, 1889. Serial No. 325,587. (No model.)

*To all whom it may concern:*

Be it known that I, JOHN C. STURGEON, a citizen of the United States, residing at the city of Erie, in the county of Erie and State of Pennsylvania, have invented certain new and useful Improvements in Pipe or Hose Couplings; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in pipe or hose couplings hereinafter set forth and explained, and illustrated in the accompanying drawings.

Figure 1:
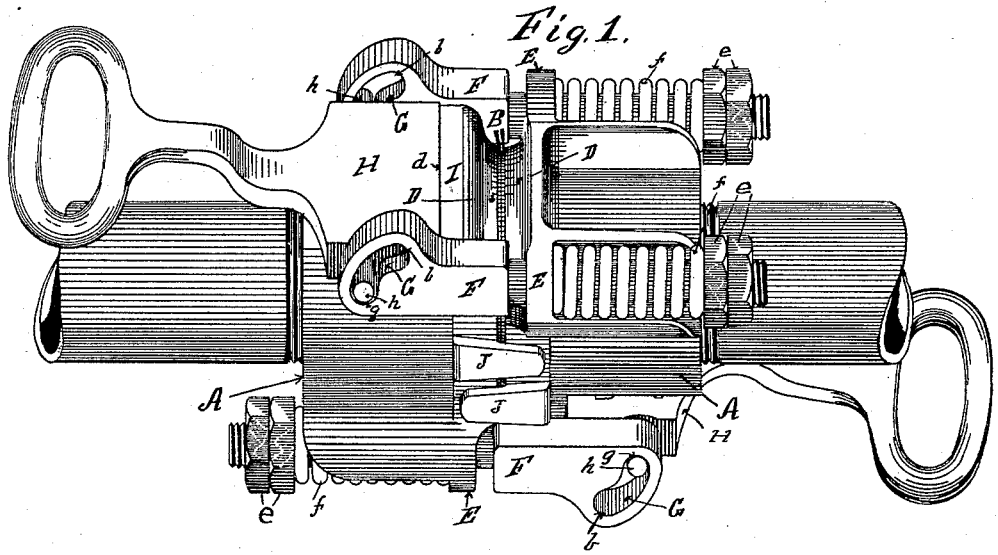
Figure 2:
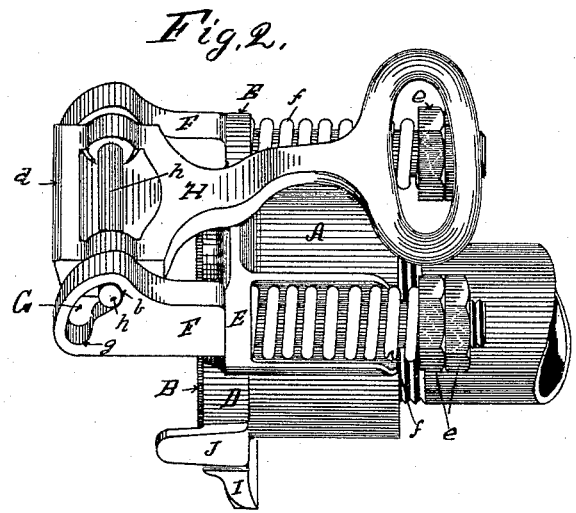
Figure 3:
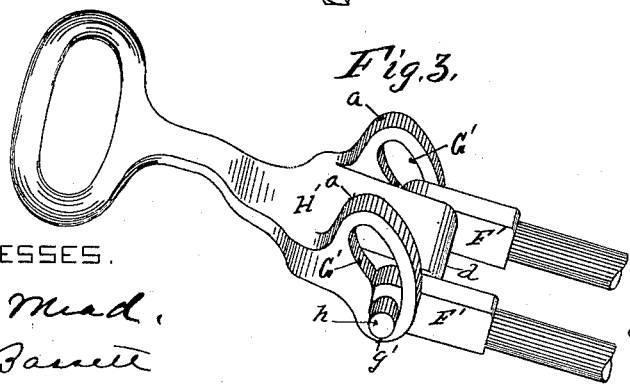

Figure 1 is a perspective view of my improved pipe or hose coupling. Fig. 2 is a perspective view of one section of the coupling, showing the locking-lever thrown back. Fig. 3 is a perspective view of a modified form of the locking-lever and spring-bolts.

The principal objects of my invention are, first, to construct a pipe or hose coupling consisting of duplicate halves or sections for connecting steam pipes or hose between railway-cars, in which the locking-levers are pivoted directly to the ends of spring locking-bolts by means of pintles operating in slotted holes in the bolts or in the locking-levers, so that in locking up the coupling the locking-levers will travel downward behind catches on the opposite halves or sections of the coupling, thus doing away with the hinged links for that purpose; second, to construct such coupling with four spring-bolts, two on each half of the coupling, so that the two halves of the coupling are secured together with four locking-bolts, each located at a different point on the periphery of the coupling-face, each pair of locking-bolts being operated by a single lever, whereby the packing-faces are firmly compressed together and the wear automatically taken up, so as to prevent leakage, and at the same time the couplings are adapted to be quickly coupled or uncoupled when desired.

Other features of my invention will appear hereinafter in the specification and claims.

In the construction of my improved pipe and hose coupling shown, A A are duplicate halves or sections of a straight-way coupling, each having a cylindrical passage-way or opening therein corresponding to that in the pipes or hose to be coupled and opening through a coupling-face B thereon, so that when the coupling-faces on two halves or sections of the coupling are brought together, as illustrated in Fig. 1, a straight passage is formed from one section of the pipe or hose so coupled to the other. These features, however, are common in pipe and hose couplings, and therefore well understood.

In the outer end of the head D of each half or section A of the coupling is secured the coupling-face B, consisting of suitable packing, so that when the two faces are secured together a steam-tight joint will be formed thereby. To the periphery of the head D of each half or section I secure an ear or ears E, and when two such ears E are used, as shown in the drawings, I preferably place them at such distance apart that when two halves or sections of the coupling are brought together the four ears E (two being on each half or section) will be substantially equidistant from each other; but this arrangement may be varied, if desired. I also secure to the periphery D of each coupling-head A, directly opposite the ear or ears E, a catch I, with which the locking-lever, hereinafter described, is adapted to engage when two halves or sections of the coupling are locked together, the catch I on each half or section being then directly in front of the ear E (if one is used) or directly opposite and between the ears E E (if two are used) on the opposite half or section.

Through the ear or ears E on each half or section of the coupling is a sliding locking bolt or bolts F, having retracting-springs *f* thereon back of the ears E, the tension of which springs *f* is adjusted by means of nuts *e*. The outer ends of the locking-bolts F are provided with slotted openings G for the reception of the pintle *h* of the locking-lever H and project outward from the ears E a sufficient distance beyond the coupling-face B so that when two halves or sections of the coupling are brought together the point *d* of the locking-lever H will pass down behind the catch I on the opposite half or section.

On each half or section A of the coupling are guides J, which extend outward from the faces B of the coupling-heads D a sufficient distance to pass over the head D of the duplicate half when the two sections are brought together.

In placing the two halves or sections of the coupling together and locking them the locking-levers H are thrown back to the position illustrated in Fig. 2, bringing the pintles $h$ into the upper portions $b$ of the slots G, which raises the outer ends $d$ of the locking-levers H a sufficient distance to freely pass over the tops of the catches I when the two halves or sections A A of the coupling are brought together. The levers H are then turned over into the position shown in Fig. 1, which causes the pintles $h$ to travel downward in the slots G until they rest in the bottoms $g$ of the slots, where they will remain, as the inclination of the slot G is such that the bottom $g$ thereof is slightly farther out from the back of the catch I than any other portion of it, making the strain of the spring $f$ upon the locking-bars F tend always to draw the pintles $h$ down into the bottoms $g$ of the slots G.

It will be observed that in the construction of my device shown and described I am enabled to utilize four separate locking-bolts at four points on the periphery of the coupling-head, so that the coupling is thoroughly and equally braced in all directions, while at the same time I am enabled to operate the locking-bolts on each half or section with a single locking-lever, and the pintles of the locking-lever traveling in curved slots enables me to operate them easily with retracting-springs on the locking-bolts of any required strength, which cannot be done by the old method where the locking-lever is pivoted to a swinging link.

In Fig. 3 I show a modified construction of the locking-bars and locking-lever of my device. In this form slots G' are made in ears $a$ on a locking-lever H', in which pintles $h$, passing through round holes in the ends of the locking-bolts F', operate, the incline of the slots G being in the opposite direction from that of the slots G in the form shown in Figs. 1 and 2, so that when the levers H' are locked behind catches I on the opposite halves of the coupling the pintles $h$ rest in the bottoms $g'$ of the slots G'.

Having thus fully described the construction and operation of my invention, so as to enable others to make and use the same, what I claim as new, and desire to secure by Letters Patent of the United States, is—

1. The combination, in the locking mechanism of a pipe or hose coupling, of a sliding locking-lever having a retracting-spring thereon with a locking-lever pivoted to said locking-bolt by means of a pintle operating in a slotted opening in one of said parts, substantially as and for the purpose set forth.

2. The combination, in each half or section of a pipe-coupling composed of duplicate halves or sections adapted to be coupled together, of a sliding locking-bolt operating through an ear on one side of the coupling-head, a retracting-spring on said locking-bolt back of said ear, and a catch on the coupling-head opposite said ear with a locking-lever pivoted to the locking-bolt by means of a pintle operating in a slotted opening in the locking-bolt or the locking-lever, substantially as and for the purpose set forth.

3. The combination, in each half or section of a pipe and hose coupling composed of duplicate halves or sections adapted to be coupled together, of two sliding locking-bolts operating through ears on the coupling-head, retracting-springs on said locking-bolts back of said ears, and a catch on the coupling-head opposite said ears with a locking-lever pivoted to and operating both of said locking-bolts by means of a pintle operating in slotted openings in said locking-bolts or in the locking-lever, substantially as and for the purpose set forth.

4. The combination, in each half or section of a pipe or hose coupling consisting of duplicate halves or sections adapted to be coupled together, of two sliding locking-bolts operating through ears on such half or section, retracting-springs on said locking-bolts back of said ears, and a catch on the opposite side of such half or section with a locking-lever adapted to engage with the catch on a duplicate half or section of the coupling and simultaneously operate both of said sliding locking-bolts, substantially as and for the purpose set forth.

In testimony whereof I affix my signature in presence of two witnesses.

JOHN C. STURGEON.

Witnesses:
A. J. CURTZE,
C. A. LANG.